Figure 1:
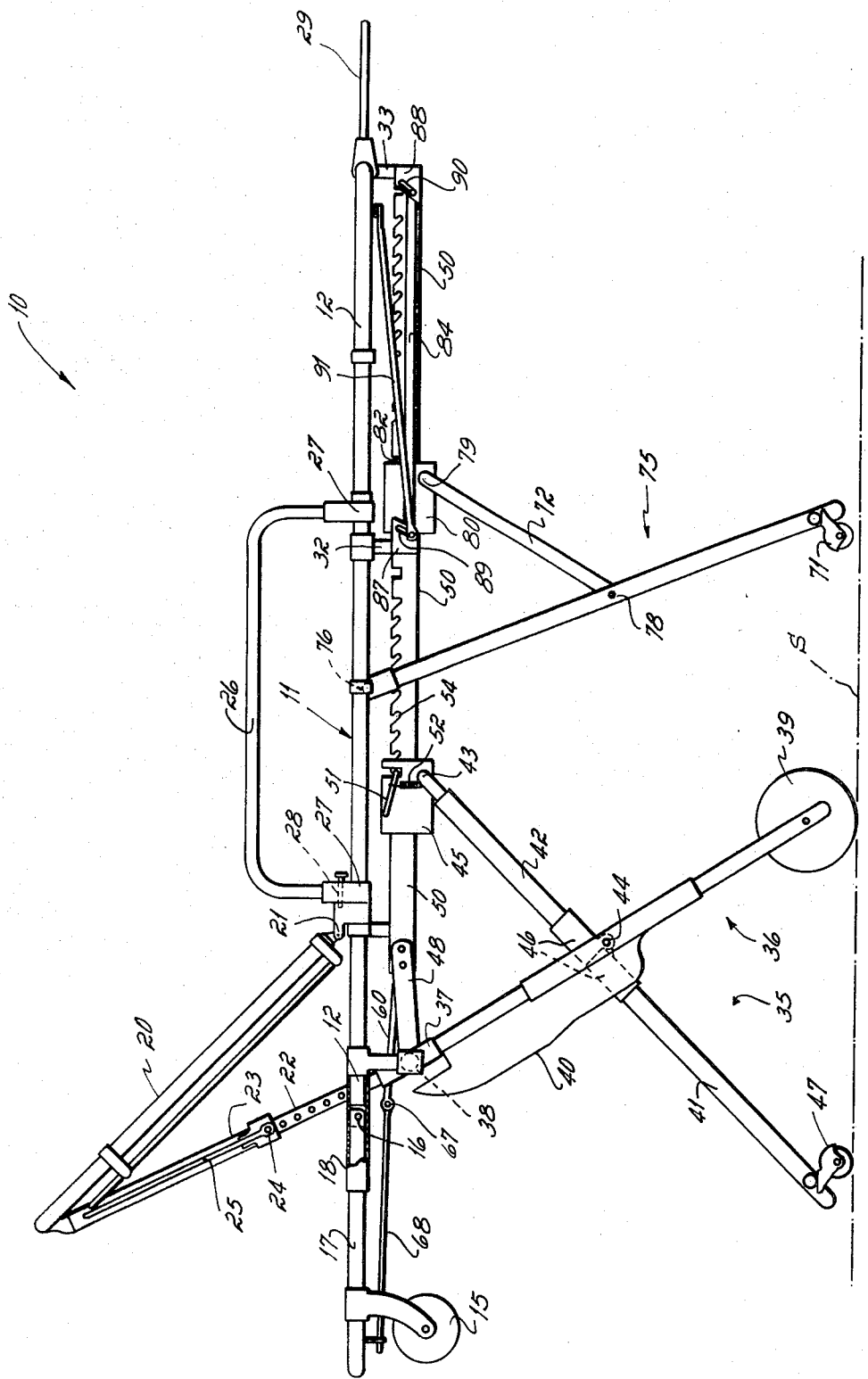

United States Patent [19]
Ferneau

[11] 3,759,565
[45] Sept. 18, 1973

[54] MULTI-LEVEL ONE-MAN CART
[75] Inventor: Richard H. Ferneau, Washington Court House, Ohio
[73] Assignee: Burt Wiel, Cincinnati, Ohio
[22] Filed: Apr. 12, 1972
[21] Appl. No.: 243,376

[52] U.S. Cl. .................................. 296/20, 108/82
[51] Int. Cl. ........................... B62h 3/02, A61g 1/02
[58] Field of Search ................ 296/20; 108/82, 117, 108/120

[56] References Cited
UNITED STATES PATENTS
3,493,262  2/1970  Ferneau ............................ 280/41 R
2,517,696  8/1950  Miller ................................. 108/117
2,438,059  3/1948  Lackey ................................. 296/20

Primary Examiner—Philip Goodman
Assistant Examiner—John A. Carroll
Attorney—James S. Hight et al.

[57] ABSTRACT

A cart for transporting articles of merchandise or human bodies comprises a bed supported principally on four legs having an X-frame configuration. The legs are capable of being angulated with respect to each other to change the level of the bed. One pair of legs is formed in two sections, the lowermost section being pivotable with respect to the upper section to permit it to swing into substantial alignment with the fixed legs. This enables a single operator to thrust the cart into a vehicle while standing at one end of the cart. In addition, the legs may be adjusted to vary the level of a cart by a single operator.

21 Claims, 5 Drawing Figures

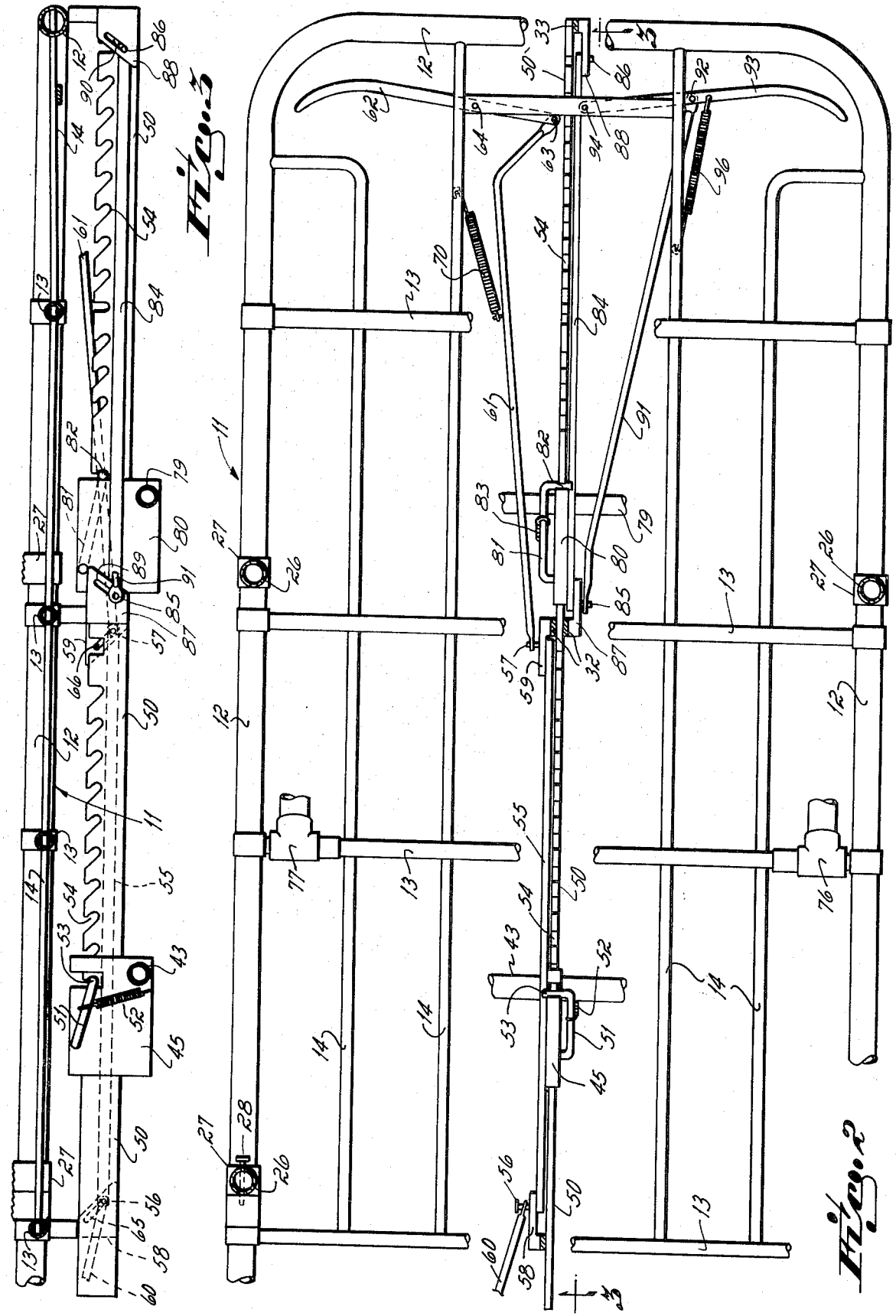

MULTI-LEVEL ONE-MAN CART

This application is related to copending U.S. application Ser. No. 200,128 filed on Nov. 18, 1971 by Richard H. Ferneau and Elroy E. Bourgraf for "A Multi-Level One-Man Cart Adapted to be Moved Up and Down Stairs."

This invention relates to a cart for transporting articles or bodies. More particularly, the invention is directed to a cart adapted for one-man loading into and out of a vehicle, the bed of the cart having at least two levels and the cart being convertible from one level to another while bearing a load.

By way of background, the cart of the present invention is an improvement in the cart disclosed in U.S. Pat. No. 3,493,262. That patent discloses a cart having a bed supported on four vertical legs, a pair of auxiliary wheels on the forward end of the cart and handles on the rear end of the cart. The legs are normally maintained in their vertical attitude by releasable braces and means are provided for releasing the braces by an operator standing at the rear of the cart. This combination enables an operator to support a heavy object on the bed of the cart and move the cart into and out of a vehicle by supporting the cart through the engagement of the auxiliary wheels with the vehicle bed as the cart is thrust into or pulled out of the vehicle. When out of the vehicle, the cart is supported by the vertical legs, the rear legs having caster wheels and the forward legs having ordinary wheels.

An objective of the invention has been to improve the cart described above in at least two major respects, namely, to provide means for enabling one man to position the bed of the cart at more than one level above ground, and to facilitate movement of the cart into and out of a vehicle. The "multi-level" feature is important, for the cart must be at one level to enable the auxiliary wheels to engage the floor of a vehicle during the loading of the cart into a vehicle and at another level for other operations.

In the case of a salesman's cart for demonstrating merchandise, it is highly advantageous to lower the level of the cart and the merchandise mounted thereon for the purpose of demonstrating the merchandise to a customer, particularly where the parts of merchandise to be manipulated are located on the upper surface of the merchandise.

In the case of handling bodies or patients, the body may have to be moved from a low-level bed onto the cart, the cart thrust into an ambulance at a higher level and the body shifted from the cart onto even a higher level hospital bed. In many cases, a patient is transferred between a nursing home and a hospital where there are no stairs to negotiate. The cart of the present invention provides the capability of one-man operation in such a situation, thereby freeing a normally required additional operator.

The objective of the invention as described above has been achieved through several important structural improvements in the cart of the type described in U.S. Pat. No. 3,493,262.

A first improvement resides in the change from vertical legs to X-configurated legs, the upper ends of at least one pair of the legs being slidable with respect to the bed of the cart so that when slid to one position, the legs raise the level of the bed and when slid to another position, the legs lower the level of the bed.

Another improvement resides in the forming of one pair of legs into two sections, so that the lowermost section is pivotable rearwardly to lie in substantially the same plane as the one-piece legs. The rearward swinging of the lower leg sections swings them out of the way so as to permit an unimpeded thrust of the cart onto the floor of a vehicle.

In the patented cart, the casters have been located at the rear of the cart, that is, at the end of the cart remote from the auxiliary wheels and the entire operation of the cart was performed from the rear of the cart. Another feature of the invention is the positioning of casters and wheels so that the cart can be easily manipulated from either end. Wheels are supported generally intermediate the ends of the cart while swiveling casters are located on legs both forward and rearward of the wheels.

For the sake of convenience of description, the end of the cart having a set of auxiliary wheels will be designated the forward end of the cart and the opposite end will be designated the rearward end of the cart. The operator stands at the rear end of the cart during the loading and unloading operations and when altering the level of the cart when its forward end is supported by a vehicle. The operator stands at either end of the cart during its movement from place to place, and at each end successively in altering the level of the cart when its forward end is not supported by a vehicle.

Another feature of the invention has been to provide a pivotal engagement of the lower leg sections with the upper leg sections. This permits the lower leg sections to be swung rearwardly from their normal positions to a position aligned with the one-piece legs and requires substantially no angular tipping of the cart. This feature, along with other features relating to the maintaining of the horizontal attitude of the cart, are important in keeping the articles or patients from sliding off the cart and in transporting those articles having fluid which might spill out of containers.

Another feature of the invention has been to provide an additional pair of collapsible legs for supporting a rearward end of the cart should the nature of the load require it. This support provides additional stability if, for instance a patient should sit up on the cart, thereby changing its center of gravity.

Another feature of the invention has been to provide a common latch bar utilized to control all pairs of collapsible legs and provided with safety means for preventing release of the latches when the cart is bearing a load and is not properly supported by a vehicle or an operator.

Another feature of the invention has been to provide a collapsible frame for supporting the auxiliary wheels in order to facilitate maneuvering in cramped areas.

Figure 4:
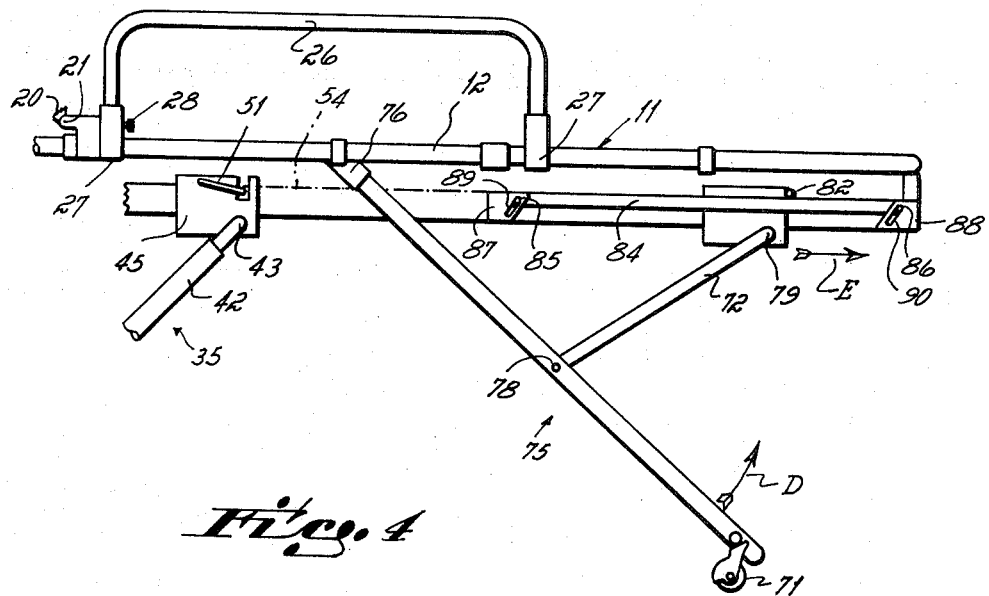
Figure 5:
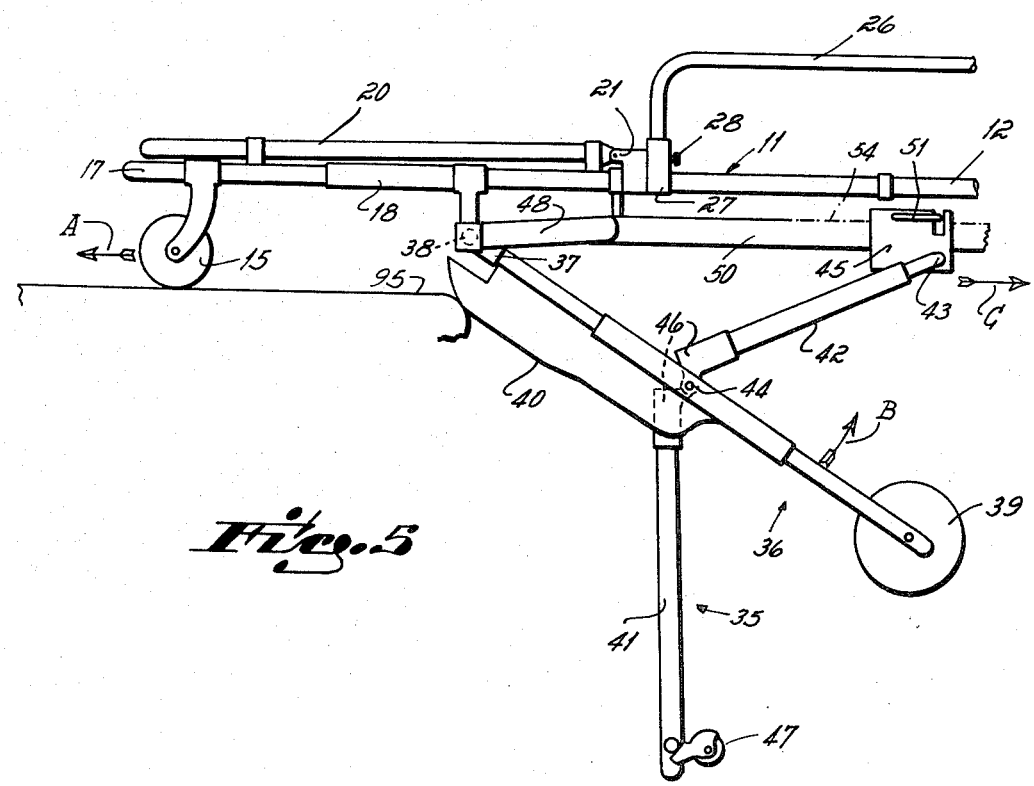

The foregoing as well as other features and objectives of the invention will become more readily apparent from the following detailed description taken in conjunction with the accompanying drawings in which:

FIG. 1 is a side view of one embodiment of the cart as adapted for patient or body transportation, FIG. 2 is a top view of the rear end of the cart of FIG. 1, showing the rear releasing elements, FIG. 3 is a cross-sectional view taken along lines 3—3 of FIG. 2, FIG. 4 is a side view of the rear end of the cart of FIG. 1, showing an intermediate position of the additional support legs, and FIG. 5 is a side view of the forward end of the cart of FIG. 1, showing the cart in an intermediate position as it is being thrust into a vehicle.

Referring to FIG. 1 of the drawings, there is designated at 10 a cart embodying the features of the present invention. While the drawings particularly depict a cart adapted for the transportation of patients or human bodies, it will be recognized that the particular features of the invention, including the collapsible leg structure, can be utilized on other types of carts as well. For purposes of description, the cart as shown in FIGS. 1 – 5 has a forward end located to the left of the drawings and a rearward end located at the right of the drawings.

The cart 10 is shown in FIG. 1 in an operative transporting condition on a support surface S. The cart includes a bed 11 which is constructed from a number of tubular frame members. These include an outer frame 12, shaped to define an outermost portion of the bed 11, and crosspieces 13 which are connected between the longitudinal runs of the outer frame 12. Longitudinal members 14 extend through appropriate bores provided in the crosspieces 13. The innermost longitudinal members 14 are connected to the transverse portion of the frame 12 at a rear end of the cart. The outermost longitudinal members 14 are bent 90° prior to engagement with the transverse portion of frame 12 and are extended perpendicularly to a longitudinal portion of frame 12 at the rear end of the cart. As shown in FIG. 2, this provides ready access to the rear corners of the cart and to the appropriate releasing handles as will be described.

Auxiliary wheels 15 are connected to a forward portion of the bed 11. This portion of the bed 11 is hinged at 16 so that it may be pivoted downwardly or upwardly to reduce the overall longitudinal dimension of the cart. This facilitates handling of the cart in cramped quarters such as hallways and the like.

The bed of the cart at the forward end comprises a frame 17 which is constructed to define the outer dimension of the forward end of the cart bed. A sleeve 18 is provided on each side of the cart bed to cover and lock the hinges 16 and to thereby maintain rigid the frame 17 in substantial alignment with the frame 12. In order to release the forward end of the cart to pivot upwardly or downwardly, the sleeve 18 is moved toward the forward end of the cart, uncovering and thereby releasing the hinge 16.

In order to provide an adjustable back rest for a patient on the cart, the bed of the cart further includes an adjustable frame 20 hinged at 21 to the frame 12. A perforated tube 22 cooperates with a larger tube 23 to position the adjustable frame 20. To this end, a pin 24 is attached to a pivotable lever 25 so as to be moveable into and out of the perforations in the tube 22. In order to adjust the position of the frame 20, the lever 25 may be actuated to move the pin 24 out of a perforation and to allow the tube 23 to be freely telescoped along the smaller tube 22 until the frame 20 is positioned in the correct attitude. The lever than may be released and the pin 24 extended in to the selected perforation. Of course, a mattress or a pad (not shown) may be placed on the bed 11 to provide comfort to a patient being transported on the cart.

A side guard 26 may be provided on either side of the cart in order to keep a patient or body from rolling off the cart. This guard may be hinged to the tubular frame member 12 at points 27. A spring loaded pin 28 carried by guard 26 cooperates with a recess in a stationary portion of the cart to provide a latch to allow the guard 26 to be positioned either in an upright position (FIGS. 1, 4 and 5) or in an inoperative position below the level of the bed of the cart in order to facilitate transfer of a patient from or to the cart. An adjustable guard, handle or foot rest 29 may be provided at the rearward end of the cart in the same manner.

The supporting structure for the cart includes three pairs of legs. Two pairs of legs cooperate to form a diagonal X-frame support for the cart. A third pair of legs is utilized to form an auxiliary support for the cart.

The X-frame support includes a forward pair of legs designated at 35 and a rearward pair of legs designated at 36. The rearward pair of legs 36 are pivoted at their upper ends 37 to a cross piece of the bed structure shown in dotted lines at 38. Wheels 39 are rotationally mounted to the bottom end of each leg and a skid 40 is provided along the forward portion of each leg of the pair of legs 36.

The forward pair of legs 35 of the X-frame support includes two legs, each having a lower section 41 and an upper section 42. While it is not shown, a skid may be provided on the forward portions of legs sections 41. Casters 47 are provided on the lower end of legs sections 41 to facilitate rolling of the cart on the supporting surfaces. The upper sections 42 are connected to the ends of a cross piece 43 which extends transversely to the bed 11 and which is mounted in a slider 45. The lower sections 41 are pivoted to the upper sections 42 at an axis 44 by hinges 46. It will be noted that hinges 46 are constructed to form abutting ends of the upper and lower leg sections. Also it will be noted that axis 44 is external of leg sections 41 and 42 such that legs 36 pivot on the same or common axis 44, thus forming the X-frame.

The slider 45 is mounted to slide upon a latch bar 50 which is appropriately secured to the bed of the cart. In FIG. 1, latch bar 50 is shown secured to a forward portion of the cart bed through brace 48 and to a central and rear portion of the cart through braces 32 and 33 respectively.

The slider 45 carries a pivotable pin 51 which is biased in a downward direction by a spring 52 (FIG. 3). The pivotal pin includes a pin extension 53 (FIG. 2) which is positioned within a slot of the slider 45 so as to be in position to cooperate with slots 54 in the latch bar 50. The slots 54 are directed downwardly and angled slightly toward the rear end of the cart.

In order to move the pin extension 53 from engagement within a slot 54, a release bar 55 (FIG. 2) is provided beneath the pin extension 53. Pins 56 and 57 are located at each end of the release bar 55. Each pin extends from the bar into respective cam blocks 58 and 59. At the forward end of the cart, the pin 56 extends through an inclined slot 65 in the cam block 58 and is connected to a control rod 60. At the rearward end of the latch bar 55, pin 57 extends through an inclined slot 66 in the cam block 59 and is connected to a control rod 61. This rod 61 is extended toward the rear of the cart where it is connected to a release lever 62 at hinge point 63. The lever itself is pivoted to the bed of the cart at 64. A spring 70 normally biases the rod 61 in a rearward direction and thereby holds release bar 55 in a rearward and downward, inoperative condition due to the engagement of pins 56 and 57 in slots 65 and 66.

It can be appreciated that when a rearward force is placed upon the outboard end of the lever 62, so as to overcome the bias of spring 70, the lever pivots clockwise about the pivot point 64, and tends to urge a rod 61 in a forwardly direction. When a forward force is transmitted through rod 61 to pin 57 and thereby to release bar 55, the pins 57 and 56 tend to ride forwardly and upwardly in their inclined slots and to raise the release bar 55 into contact with pin 53. This engagement raises the pin from the slot 54 in which it resides and releases slider 45 to allow the X-frame support to collapse as will be described.

It is also to be noted (FIG. 1) that the rod 60 is pivoted at 67 to an additional rod 68 which has an end secured to the forward end of the frame 17. The purpose of this pivoted structure is to allow the forward frame 17 of the cart 10 to be raised or lowered in order to vary the length of the cart while additionally providing a means for releasing the X-frame support of the cart from its forward end.

A pair of auxiliary support legs is designated at 75. Each leg of the pair is pivoted at an upper end to a cross member 13 of the bed of the cart as at 76 and 77 (FIG. 2). Casters 71 are provided at the lower end of legs 75 to facilitate movement of the cart when rear contact is made on the supporting surfaces. Skids (not shown) may be provided on the forward portion of legs 75 to facilitate engagement with a vehicle as will be described. A brace 72 is pivoted at 78 to each leg of the pair of legs 75 and extends upwardly to a crosspiece 79 (FIG. 3). The crosspiece 79 is mounted in a slider 80. Slider 80 is mounted on the latch bar 50 for sliding movement with respect thereto and includes a pivotable pin 81 which has a pin extension 82 for cooperating with slots 54 in the latch bar 50. The pivotable pin member is biased downwardly into the slots by a spring 83.

For removing the pin extension 82 from one of the slots 54, a release bar 84 is provided similarly to release bar 55. The release bar 84 includes pins 85 and 86 which are mounted in cam blocks 87 and 88. Each cam block has an upwardly and rearwardly extending slot 89 and 90 through which the pins 85 and 86 respectively extend. A control rod 91 is secured to pin 85 and is attached at pivot point 92 to a lever 93. Spring 96 is secured to lever 93 so as to normally bias rod 91 forwardly, thereby holding release bar 84 in a downward inoperative condition. Lever 93 is pivoted at 94 to the bed of the cart. When a rearward force is applied to the outboard end of lever 93, and the bias of spring 96 is overcome, control rod 91 exerts a rearward force on pin 85. This in turn exerts a rearward force on the bar 84. The pins 85 and 86 ride up the respective slots 89 and 90 and cause the latch bar 84 to rise, thereby urging the pin extension 82 from slot 54 in which it resides.

OPERATION

When it is desired to place the cart into a vehicle, the legs must generally be collapsed so as to accommodate the cart within the vehicle. As shown in FIG. 5, a portion of the vehicle is depicted at 95. This could be a tailgate vehicle bed, or other surface onto which the cart is to be placed. An operator standing at the rear end of the cart thrusts it towards the opening of the vehicle in the direction of arrow A (FIG. 5). The auxiliary wheels 15 first engage the vehicle portion 95 and serve to support the forward end of the cart.

The next portion of the cart to engage the vehicle is the skid 40. At this time, and since the forward portion is supported by the vehicle, an operator to the rear of the cart may exert a rearward force on lever 62 which causes the control rod 61 to move in a forwardly direction, and thereby exert a forward force on pin 57. Pin 57 rides up slot 66 carrying with it the release bar 55. The forward end of the release bar 55 is also moved in a general upward direction due to the action of pin 56 in combination with the inclined slot 65. The upward motion of the release bar 55 urges pin extension 53 out of any slot in which it resides, thereby allowing the slider 45 to freely move along the latch bar 50.

As the skid 40 engages the vehicle portion 95, the pair of legs 36 is urged in a counterclockwise direction (Arrow B) about the crosspiece 38. This force causes the release slider 45 to move rearwardly along latch bar 50 in direction of Arrow C (FIG. 5).

At the same time and since the pair of legs 36 is being moved upwardly from any supporting surface, the lower section 41 of the forward pair of legs 35 tends to pivot about pivot point 44. Continued engagement of the skid 40 with the vehicle will move the pair of legs 36 into a generally horizontal position. As the cart is thrust further into the vehicle, the vehicle portion 95 will engage the lower sections 41 of the forward pair of legs and will tend to pivot them further about pivot point 44 until they lie in general horizontal attitude adjacent the legs 36.

As the forward thrust of the cart is further continued, an operator standing at the rear of the cart exerts a rearward pressure on lever 93 which causes latch bar 84 to move in an upwardly direction, similarly to latch bar 55. This releases pin 82 from any slot 54 in which it resides and allows sliding member 80 to move along latch bar 50. As the cart is thrust into the vehicle, the legs 75 will engage the vehicle portion 95 and will be pivoted (Arrow D, FIG. 4) about the crosspiece to which the upper ends of the legs are mounted. This motion causes the slider 80 to move rearwardly along latch bar 50 in the direction of Arrow E. Latch bar 50 is long enough to allow the legs 75 to be rotated into a generally horizontal position, and thus, the cart may be completely thrust into the vehicle in a level attitude with the legs collapsed. It can be appreciated that the loading operation is normally accomplished in a single smooth thrusting motion accompanied by selective operations of the control levers.

Removal of the cart from a vehicle is simply accomplished by merely withdrawing the rearward end of the cart from the vehicle. The pair of legs 75 will tend to fall towards the ground or other supporting surface until pin extension 82 is received in an appropriate slot 54. This may be controlled by a selective actuation of the lever 93.

As the cart is further withdrawn from the vehicle, the X-frame support is lowered toward the ground or supporting surface. When the skid 40 passes the end of the vehicle portion 95, final position of the X-frame is controlled by selective actuation of lever 62 as can be appreciated.

It will be noted that auxiliary wheels 15 are positioned a substantial distance forwardly of the upper ends of the rearward pair of legs 36. This provides the capability of completely and finally securing the X- frame support in a positive locked condition prior to the time that the forward end of the cart is completely removed from the vehicle. Thus, a substantial safety feature is accomplished and a single operator is able to secure the cart prior to the time it is removed from the vehicle. In addition, and in the situation where the cart is to be loaded onto the vehicle, a further safety feature is accomplished since the auxiliary wheels engage the vehicle for an appreciable time prior to the point at which the X-frame is collapsed by engagement of the skid 40 with the vehicle.

In another operation, an operator may wish to vary the level of the cart while it is bearing a load. Since the slots 54 in latch bar 50 are directed downwardly and rearwardly, it can well be appreciated that when the leg supports of the cart are bearing any load, that load forces pin extension 53 and 82 into the upper inclined portion of the slots 54. In this condition, the release bars 55 and 84 cannot be actuated against the force of the extensions 53 and 82 on the upper portions of the slots. In order to vary the height of the cart while it is bearing a load, an operator standing at the rearward end of the cart may raise the auxiliary support legs off any ground to remove any load on them. He can then release the pin by actuation of the lever 93 and gently lower the end of the cart to the proper position. He then moves to the forward end of the cart and raises it slightly, removing any load on the X-frame support. Control rod 68 and 60 can now be actuated to release the pin extension 53. The cart can then be lowered until the proper height is reached. At this point control rod 68 is released, thereby allowing the spring 52 to pull the pin 53 into engagement with a slot 54. The cart may thereby be lowered or raised to a selected position corresponding to any of the slots 54 in the common latch bar 50.

If two operators are available, one may position himself at either end of the cart, and if the operator at the forward end of the cart lifts it so as to relieve the load from the X-frame support, the operator at the rearward end of the cart may actuate the respective control handles 62 and 93 in order to release all supporting legs. The cart may thereafter be raised or lowered to the desired height. The operator at the rearward end of the cart then releases the lever 62 and 93, thereby allowing the pins 53 and 82 to drop within the slots 54 and positively lock the cart into the selected level.

While I have described in detail one embodiment of my invention, other modifications and alterations will become readily apparent to one of ordinary skill in the art without departing from the scope of the invention, and I intend to be bound only by the appended claims.

I claim:

1. A cart comprising:
    means forming a generally horizontal bed,
    diagonal forward and rearward pairs of legs secured to said bed and intersecting at their mid-sections to provide an X-frame support for said cart,
    the forward pair of legs being formed in upper and lower leg sections pivoted to each other on a common axis,
    means bracing said lower section generally in alignment with said upper section, and
    said lower section being adapted to swing rearwardly into approximate alignment with said rearward legs.

2. A cart as in claim 1 further comprising auxiliary wheels mounted at the forward end of said bed to permit said cart to be rolled into a vehicle.

3. A cart as in claim 2 wherein said forward end of said bed is pivoted to the remainder of said bed.

4. A cart as in claim 3 wherein the upper ends of the diagonal rearward pair of legs forming said X-frame support are located rearward of the pivot point of the forward end of said bed to the remainder of said bed.

5. A cart as in claim 1 further comprising:
    means slidably mounting the upper ends of one pair of said legs on said bed,
    releasable means normally bracing said upper ends of said one pair of legs to hold said cart in an erect condition, said releasable means when released permitting said X-frame to collapse until said legs lie generally flat along said bed.

6. A cart as in claim 5 wherein said slidable mounting means includes:
    a transverse crosspiece secured to the upper ends of said one pair of legs,
    a longitudinally extending latch bar secured to said bed, and
    a sliding member pivotally secured to said crosspiece, and slidingly mounted on said latch bar.

7. A cart as in claim 6 wherein said releasable means includes:
    a plurality of notches in said latch bar,
    pivotable pin means carried by said sliding member and having a portion normally biased toward and residing in at least one of said notches, and
    means for urging said pin means out of said notches to permit adjustment of said X-frame and of the level of said bed.

8. A cart as in claim 7 wherein said means for urging said pin means out of said notches comprises:
    a releasing bar,
    release bar actuating means, and
    first and second means at the end of said releasing bar for cooperating to raise said releasing bar and said pivotable pin means when said release bar actuating means are operated.

9. A cart as in claim 8 wherein said notches extend downwardly and rearwardly into said latch bar.

10. A cart as in claim 1 in which said bracing means comprises
    a transverse member pivotally securing, about the common axis, said diagonal forward and rearward pairs of legs at said mid-sections, said upper and lower leg sections being pivoted to said transverse member on said common axis,
    said upper and lower leg sections being pivoted at a hinge point external of said sections and when extended said sections being thereby braced end to end in substantial alignment.

11. A cart as in claim 1 further comprising
    rotatable means on the forward and rearward diagonal pairs of legs of said cart, and
    skids on said rearward legs extending from an upper portion of said legs a substantial distance along said rearward legs, thereby providing a surface means for engaging a vehicle and for facilitating collapse of said diagonal pairs of legs when said cart is thrust into a vehicle.

12. A cart as in claim 11 wherein said rotatable means on said rearward pair of legs are wheels.

13. A cart as in claim 11 wherein said rotatable means on said forward pair of legs are casters.

14. A cart as in claim 1 wherein said bed comprises frame means for supporting a cushion.

15. A cart as in claim 14 wherein said frame means includes means for adjusting at least a forward portion of said cart bed and said cushion with respect to the horizontal.

16. A cart as in claim 1 further including a third pair of adjustable support legs having upper ends pivoted to said bed.

17. A cart as in claim 16 including adjustable brace means for variably positioning said third pair of legs.

18. A cart as in claim 17 wherein said adjustable brace means includes:
a latch bar secured to said bed,
a sliding member mounted on said latch bar,
brace members pivoted respectively at one end to a mid-section of each leg of said third pair of legs and at another end to said sliding member, and
means for alternately and positively connecting said sliding member to said latch bar.

19. A cart as in claim 18 wherein said connecting means includes:
a plurality of notches in said latch bar,
pivotable pin means carried by said sliding member and having a portion normally biased toward and residing in at least one of said notches, and
means for urging said pin means out of said notches to permit adjustment of said third pair of legs and of the level of said cart.

20. A cart as in claim 19 wherein said means for urging said pin means out of said notches comprises a releasing bar, release bar actuating means, and
first and second means at the ends of said releasing bar for cooperating to raise said releasing bar and said pivotable pin means when said release bar actuating means are operated.

21. A cart as in claim 20 wherein said notches extend downwardly and rearwardly into said latch bar.

* * * * *